United States Patent
Lee et al.

(10) Patent No.: US 9,089,817 B2
(45) Date of Patent: Jul. 28, 2015

(54) SYSTEM FOR DENITRIFYING EXHAUST GAS CAPABLE OF PREVENTING BLOCKAGES IN A UREA WATER INFLOW PATH AND AN INJECTION NOZZLE, AND DEVICE FOR SUPPLYING UREA WATER CAPABLE OF PREVENTING THE COAGULATION OF UREA WATER

(75) Inventors: Soo-Tae Lee, Busan (KR); Won-Suk Choi, Busan (KR); Sung-Ho Hong, Seoul (KR); Gyeong-Woo Kang, Busan (KR); Chang-Hoon Shin, Gyeonggi-do (KR)

(73) Assignees: Panasia Co., Ltd., Busan (KR); Korea Power Engineering Company, Inc., Gyeonggi-do (KR)

( * ) Notice: Subject to any disclaimer, the term of this patent is extended or adjusted under 35 U.S.C. 154(b) by 414 days.

(21) Appl. No.: 13/522,561

(22) PCT Filed: Oct. 28, 2010

(86) PCT No.: PCT/KR2010/007475
§ 371 (c)(1),
(2), (4) Date: Jul. 17, 2012

(87) PCT Pub. No.: WO2011/090258
PCT Pub. Date: Jul. 28, 2011

(65) Prior Publication Data
US 2012/0299205 A1 Nov. 29, 2012

(30) Foreign Application Priority Data

Jan. 20, 2010 (KR) .................. 10-2010-0005110

(51) Int. Cl.
*B01D 53/78* (2006.01)
*B01D 53/56* (2006.01)
(Continued)

(52) U.S. Cl.
CPC ........... *B01D 53/9409* (2013.01); *F23J 15/003* (2013.01); *B01D 53/90* (2013.01);
(Continued)

(58) Field of Classification Search
CPC ........ B01D 53/78; B01D 47/06; B01D 53/56; F23G 7/06
USPC .......................................................... 422/169
See application file for complete search history.

(56) References Cited

U.S. PATENT DOCUMENTS

| | | | |
|---|---|---|---|
| 6,432,373 B1* | 8/2002 | Tanazawa et al. | 423/235 |
| 6,910,954 B2* | 6/2005 | Kim et al. | 451/60 |
| 2006/0179823 A1* | 8/2006 | Hinz et al. | 60/288 |

FOREIGN PATENT DOCUMENTS

| JP | 2007-000783 | 1/2007 |
|---|---|---|
| JP | 2007-002765 | 1/2007 |

(Continued)

OTHER PUBLICATIONS

English translation of JP-2007-000783 A—dated Jan. 11, 2017.*
(Continued)

*Primary Examiner* — Walter D Griffin
*Assistant Examiner* — Huy-Tram Nguyen
(74) *Attorney, Agent, or Firm* — Workman Nydegger

(57) ABSTRACT

A system for denitrifying exhaust gas, including a urea water injection unit for supplying urea water and air to a reaction chamber, wherein the urea water injection unit includes: an air supply unit for supplying external air to an injector through an air supply line; a urea water supply unit for supplying urea water to the injector through a urea water supply line; a water supply unit for supplying water to the injector through a water supply line connected to one side of the urea water supply line; a flow control valve for selectively supplying water or urea water to the injector through the urea water supply line; and the injector respectively connected to the air supply unit and the urea water supply unit to selectively discharge air, urea water or water to the reaction chamber through an injection nozzle.

4 Claims, 4 Drawing Sheets

(51) Int. Cl.
  *B01D 47/06*  (2006.01)
  *F23G 7/06*   (2006.01)
  *B01D 53/94*  (2006.01)
  *F23J 15/00*  (2006.01)
  *B01D 53/90*  (2006.01)

(52) U.S. Cl.
  CPC ... *B01D2251/2067* (2013.01); *B01D 2259/124* (2013.01); *F23J 2215/10* (2013.01); *F23J 2219/10* (2013.01); *F23J 2219/40* (2013.01)

(56) References Cited

FOREIGN PATENT DOCUMENTS

| | | |
|---|---|---|
| KR | 2005-0039463 | 4/2005 |
| KR | 2009-0082669 | 7/2009 |

OTHER PUBLICATIONS

International Search Report dated Aug. 26, 2011, issued in PCT/KR2010/007475, filed on Oct. 28, 2010.

Written Opinion dated Aug. 25, 2011, issued in PCT/KR2010/007475, filed on Oct. 28, 2010.

\* cited by examiner

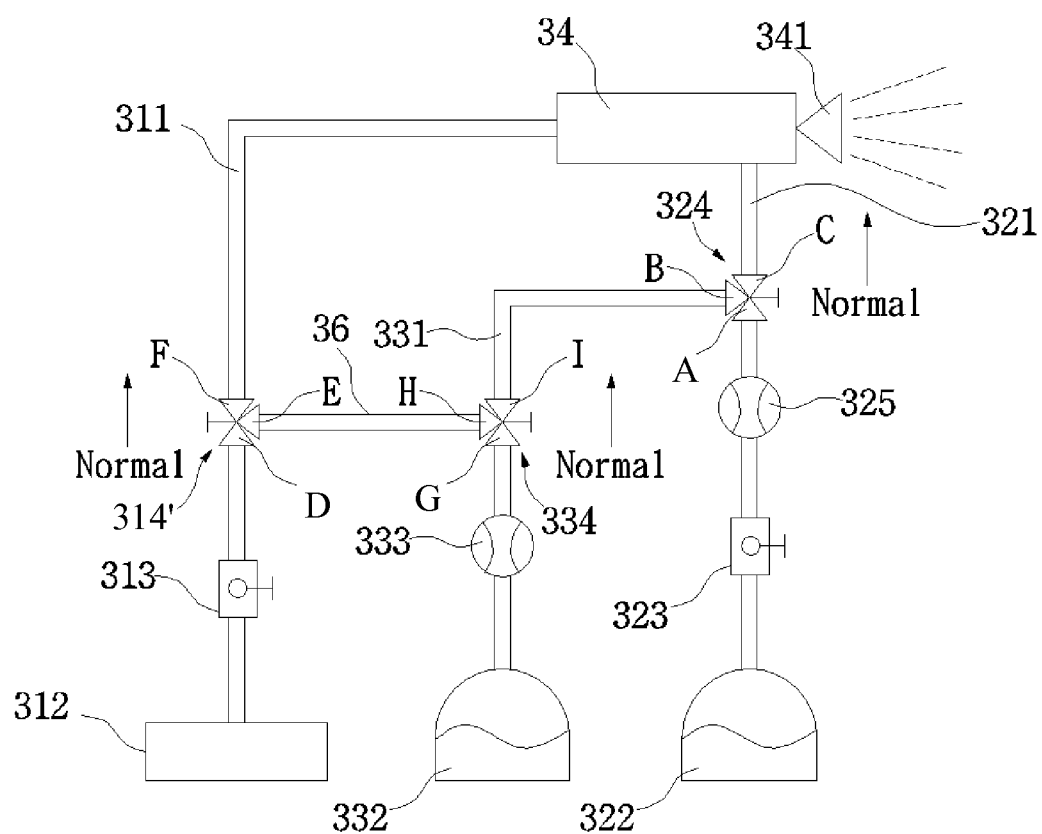

SYSTEM FOR DENITRIFYING EXHAUST GAS CAPABLE OF PREVENTING BLOCKAGES IN A UREA WATER INFLOW PATH AND AN INJECTION NOZZLE, AND DEVICE FOR SUPPLYING UREA WATER CAPABLE OF PREVENTING THE COAGULATION OF UREA WATER

TECHNICAL FIELD

The present invention relates to a system for denitrifying exhaust gas, including a urea water injection unit for supplying urea water and air to a reaction chamber, wherein the urea water injection unit includes: an air supply unit for supplying external air to an injector through an air supply line; a urea water supply unit for supplying urea water to the injector through a urea water supply line; a water supply unit for supplying water to the injector through a water supply line connected to one side of the urea water supply line; a flow control valve for selectively supplying water or urea water to the injector through the urea water supply line; and the injector respectively connected to the air supply unit and the urea water supply unit to selectively discharge air, urea water or water to the reaction chamber through an injection nozzle, wherein water is supplied to the injection nozzle and urea water supply line which are clogged in a procedure of continuously discharging urea water and air into the reaction chamber, thus preventing the injection nozzle and the urea water supply line from being clogged, and to device for supplying urea water, which can prevent urea water from coagulating.

BACKGROUND ART

Exhaust gas discharged in the process of burning fossil fuel contains $NO_x$ known to be a material causing acid rain and respiratory diseases. Therefore, in order to remove $NO_x$ from exhaust gas, selective catalytic reduction (SCR) using ammonia as a reductant is variously applied.

FIG. 1 shows a conventional system for denitrifying exhaust gas.

Referring to FIG. 1, the conventional system for denitrifying exhaust gas is configured such that urea water and air are injected into a reaction chamber 4 by an injector 34 to convert urea water into ammonia, $NO_x$ is removed using a catalyst charged in a reactor 5 to obtain an optimum denitrification efficiency, and environment pollution attributable to $NO_x$ or ammonia is effectively prevented. However, in the procedure of continuously discharging urea water into the reaction chamber 4 through an injection nozzle 341 of the injector 34, air introduced into the injector 34 by an air supply unit 31 is heated to high-temperature exhaust gas in the reaction chamber 4, so that the urea water introduced into the injector 34 is evaporated, with the result that the urea water is coagulated to clog the injection nozzle 341. Further, in the procedure of introducing urea water into the injector 34 by a urea water supply unit 32, the urea water has a predetermined viscosity and so the urea water does not pass through a urea water supply line 321 from the output end of a flow control pump 325 to the injector 34 and stays therein to form a dead zone. The urea water staying in the dead zone coagulates, and further coagulates during the procedure of continuously supplying the urea water into the injector 34, so that the urea water supply line 321 is clogged by the coagulated urea.

DISCLOSURE

Technical Problem

Accordingly, the present invention has been made to solve the above-mentioned problems, and an object of the present invention is to provide a system for denitrifying exhaust gas, wherein the system includes a water supply unit connected to one side of a urea water supply line; and a flow control valve provided at the portion at which the urea water supply line is connected with a water supply line to selectively supply water or urea water to an injector, so that an injection nozzle and a urea water supply line which are clogged in the procedure of continuously discharging urea water to a reaction chamber can be easily washed, thereby preventing the injection nozzle and the urea water supply line from being clogged, and to provide a device for supplying urea, which can prevent urea water from coagulating.

Another object of the present invention is to provide a system for denitrifying exhaust gas, wherein the system includes a bypass line for connecting a urea water supply line located behind the output end of the flow control valve with an air supply line; and an air control valve provided at the portion at which the bypass line is connected with an air supply line, so that the problem of the urea water supply line and the injection nozzle being clogged can be solved, it is possible to prevent the concentration of urea water from becoming low when the urea water is supplied again, and it is possible to prevent the urea water supply line from corroding, and to provide a device for supplying urea water, which can prevent urea water from coagulating.

Still another object of the present invention is to provide a system for denitrifying exhaust gas, wherein the system includes an air bypass line for connecting the air supply line with the water supply line; an air control valve provided at a portion at which the air supply line is connected with the air bypass line to control air such that the air is supplied to the injector through the air supply line or is supplied to the air bypass line; and a water control valve provided at a portion at which the air supply line is connected with the air bypass line to control air or water such that the air or water supplied through the air bypass line is supplied to the urea water supply line, so that the problem of the urea water supply line and the injection nozzle being clogged can be solved, and it is possible to prevent the urea water supply line from corroding, and to provide a device for supplying urea water supply, which can prevent urea water from coagulating.

Technical Solution

In order to accomplish the above objects, an aspect of the present invention provides a system for denitrifying exhaust gas, including a urea water injection unit for supplying urea water and air to a reaction chamber, wherein the urea water injection unit includes: an air supply unit for supplying external air to an injector through an air supply line; a urea water supply unit for supplying urea water to the injector through a urea water supply line; a water supply unit for supplying water to the injector through a water supply line connected to one side of the urea water supply line; a flow control valve for selectively supplying water or urea water to the injector through the urea water supply line; and the injector respectively connected to the air supply unit and the urea water supply unit to selectively discharge air, urea water or water to the reaction chamber through an injection nozzle, wherein water is supplied to the injection nozzle and urea water supply line which are clogged in a procedure of continuously discharging urea water and air into the reaction chamber, thus preventing the injection nozzle and the urea water supply line from being clogged.

In the system for denitrifying exhaust gas, the urea water injection unit may further include: a flow control pump connected to an output end of the flow control valve to supply urea water or water to the injector depending on the opening direction of the flow control valve.

Further, the urea water injection unit may further include: a bypass line for connecting the urea water supply line located behind an output end of the flow control valve with the air supply line; and an air control valve for controlling air such that the air is supplied to the injector through the air supply line or is supplied to the injector through the bypass line.

Further, the urea water injection unit further may further include: an air bypass line for connecting the air supply line with the water supply line; an air control valve provided at a portion at which the air supply line is connected with the air bypass line to control air such that the air is supplied to the injector through the air supply line or is supplied to the air bypass line; and a water control valve provided at a portion at which the air supply line is connected with the air bypass line to control air or water such that the air or water supplied through the air bypass line is supplied to the urea water supply line.

Further, the air supply unit may include an air moving unit provided at the starting point of the air supply line to move air; the urea water supply unit may include a urea water storage tank provided at the starting point of the urea water supply line to store urea water; and the water supply unit may include a water storage tank provided at the starting point of the water supply line to store water.

Further, the urea water supply unit may further include a flow control pump, one side of which is connected to an outlet of the urea water storage tank and the other side of which is connected to the flow control valve; and the water supply unit may further include a water control pump, one side of which is connected to an outlet of the water storage tank and the other side of which is connected to the water control valve.

Another aspect of the present invention provides a device for supplying urea water, which can prevent urea water from coagulating, including: an air supply unit for supplying external air to an injector through an air supply line; a urea water supply unit for supplying urea water to the injector through a urea water supply line; a water supply unit for supplying water to the injector through a water supply line connected to one side of the urea water supply line; a flow control valve for selectively supplying water or urea water to the injector through the urea water supply line; and the injector respectively connected to the air supply unit and the urea water supply unit to selectively discharge air, urea water or water to the reaction chamber through an injection nozzle.

The device for supplying urea water may further include: a flow control pump connected to an output end of the flow control valve to supply urea water or water to the injector depending on the opening direction of the flow control valve.

The device for supplying urea water may further include: a bypass line for connecting the urea water supply line located behind an output end of the flow control valve with the air supply line; and an air control valve provided at a portion at which the air supply line is connected with the bypass line to control air such that the air is supplied to the injector through the air supply line or is supplied to the injector through the bypass line.

The device for supplying urea water may further include: an air bypass line for connecting the air supply line with the water supply line; an air control valve provided at a portion at which the air supply line is connected with the air bypass line to control air such that the air is supplied to the injector through the air supply line or is supplied to the air bypass line; and a water control valve provided at a portion at which the air supply line is connected with the air bypass line to control air or water such that the air or water supplied through the air bypass line is supplied to the urea water supply line.

Advantageous Effects

The system for denitrifying exhaust gas according to the present invention includes a water supply unit connected to one side of a urea water supply line; and a flow control valve provided at the portion at which the urea water supply line is connected with a water supply line to selectively supply water or urea water to an injector, so that an injection nozzle and a urea water supply line which are clogged in the procedure of continuously discharging urea water to a reaction chamber can be easily washed, thereby preventing the injection nozzle and the urea water supply line from being clogged.

Further, the system for denitrifying exhaust gas according to the present invention includes a bypass line for connecting a urea water supply line located behind the output end of the flow control valve with an air supply line; and an air control valve provided at the portion at which the bypass line is connected with an air supply line, so that the problem of the urea water supply line and the injection nozzle being clogged can be solved, it is possible to prevent the concentration of urea water from becoming low when the urea water is supplied again, and it is possible to prevent the urea water supply line from corroding.

Furthermore, the system for denitrifying exhaust gas according to the present invention includes an air bypass line for connecting the air supply line with the water supply line; an air control valve provided at the portion at which the air supply line is connected with the air bypass line to control air such that the air is supplied to the injector through the air supply line or is supplied to the air bypass line; and a water control valve provided at a portion at which the air supply line is connected with the air bypass line to control air or water such that the air or water supplied through the air bypass line is supplied to the urea water supply line, so that the problem of the urea water supply line and the injection nozzle being clogged can be solved, and it is possible to prevent the urea water supply line from corroding.

DESCRIPTION OF DRAWINGS

FIG. 5 is an enlarged view concretely explaining a urea water injection unit according to still another embodiment of the present invention.

Figure 1:
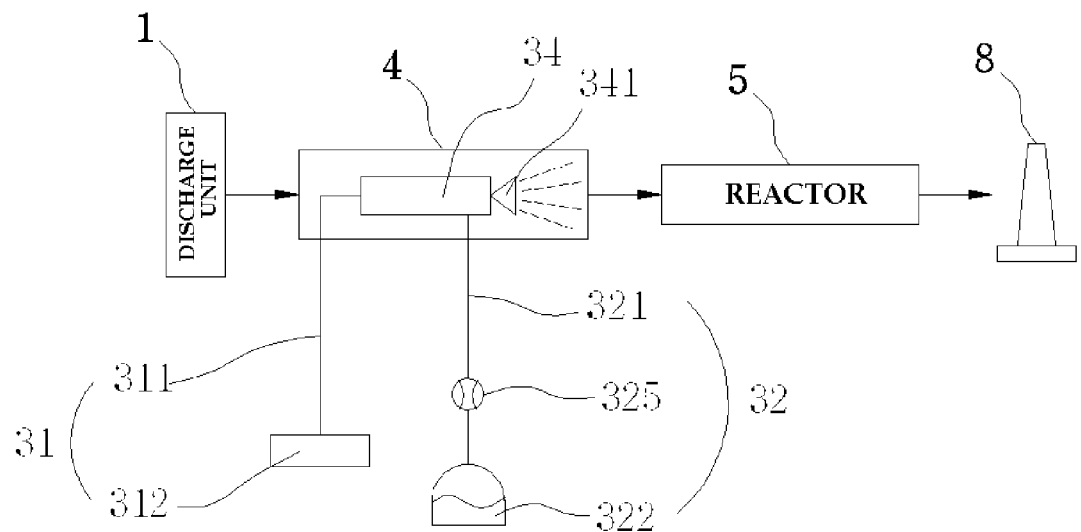
FIG. 1 is a schematic view showing a conventional system for denitrifying exhaust gas.

| <Description of the Reference Numerals in the Drawings> | |
|---|---|
| 1: discharge unit | 2: output sensor |
| 3: urea water injection unit | 4: reaction chamber |
| 5: reactor | 6: heat exchanger |
| 7: control unit | 31: air supply unit |
| 32: urea water supply unit | 33: water supply unit |
| 34: injector | 35: bypass line |
| 36: air bypass line | 311: air supply line |
| 312: air moving unit | 313: air filter |
| 314, 314': air control valve | 321: urea water supply line |
| 322: urea water storage tank | 323: flow meter |
| 324: flow control valve | 325: flow control pump |
| 331: water supply line | 332: water storage tank |
| 333: water control pump | 334: water control valve |
| 341: injection nozzle | |

BEST MODE

Hereinafter, preferred embodiments of the present invention will be described in detail with reference to the attached drawings. Throughout the accompanying drawings, the same reference numerals are used to designate the same or similar components, and redundant descriptions thereof are omitted. Further, in the description of the present invention, when it is determined that the detailed description of the related art would obscure the gist of the present invention, the description thereof will be omitted. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

Figure 2:
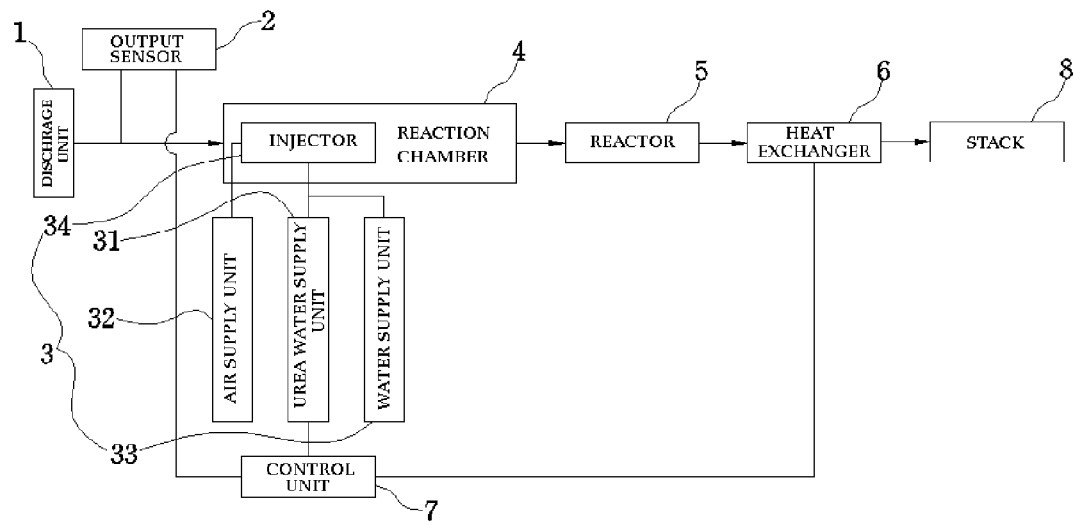
FIG. 2 is a block diagram showing a system for denitrifying exhaust gas, which can prevent a urea water supply line and an injection nozzle from being clogged, according to an embodiment of the present invention.
Figure 3:
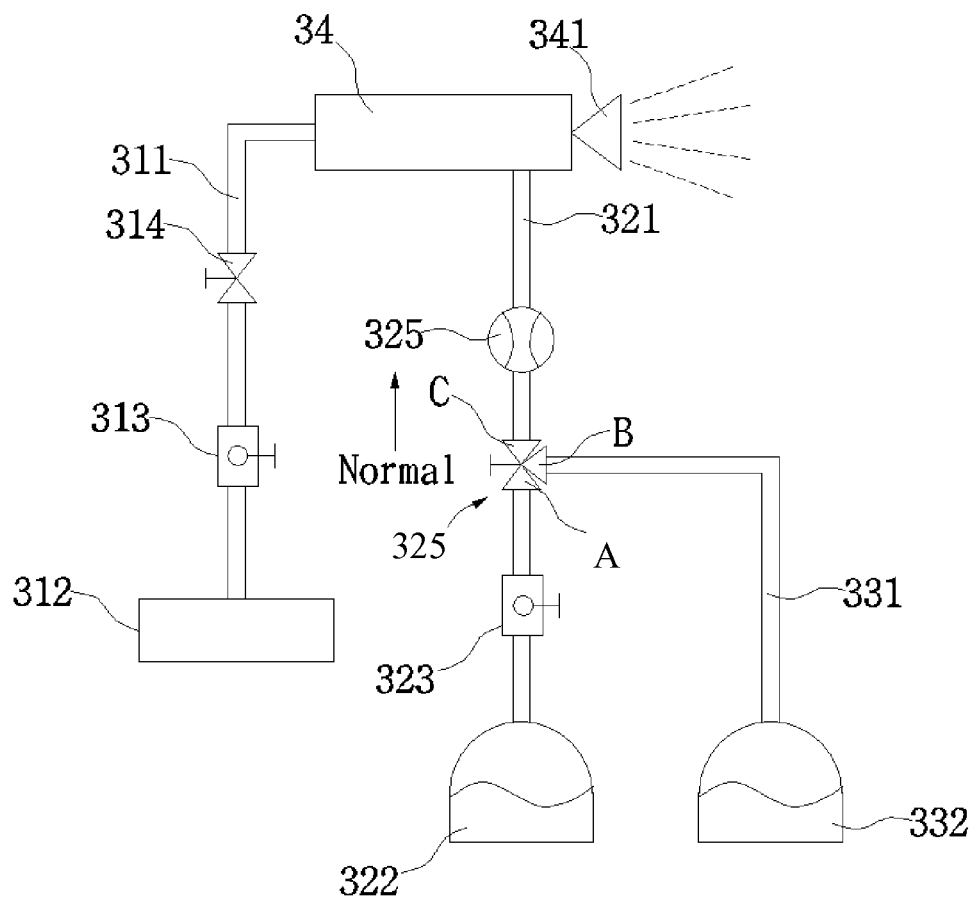
FIG. 3 is an enlarged view concretely explaining a urea water injection unit according to an embodiment of the present invention.
Figure 4:
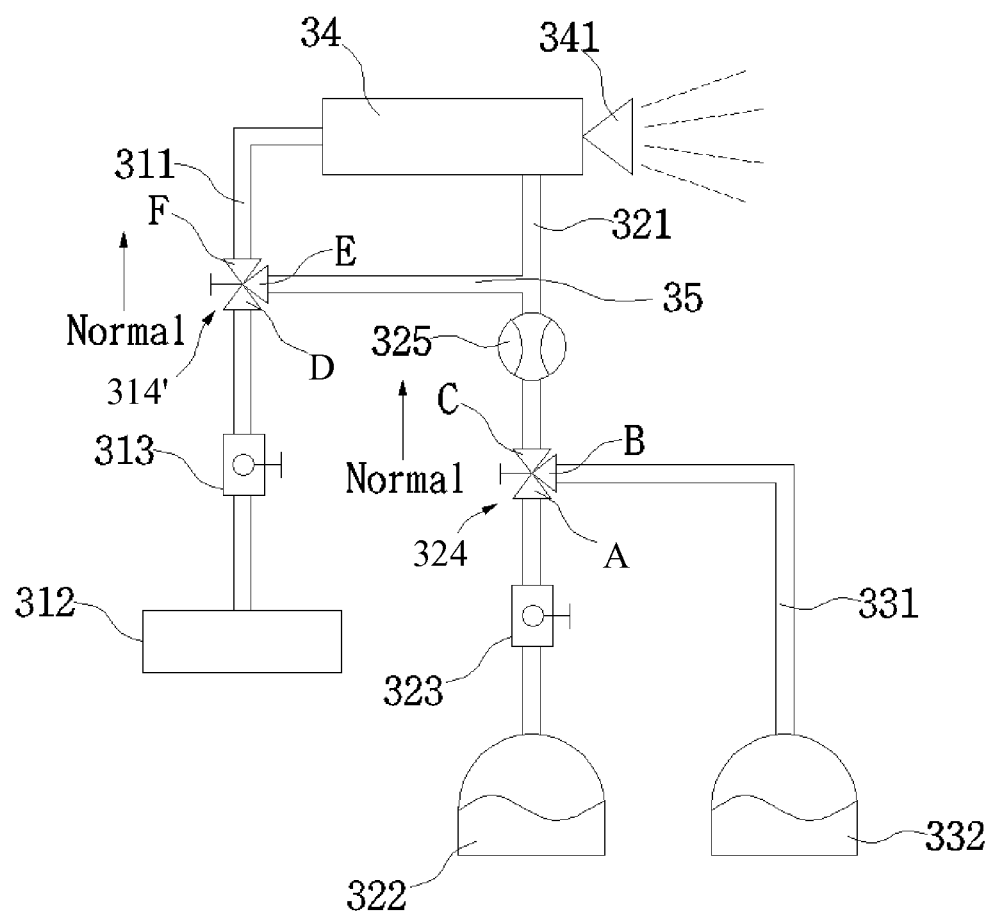
FIG. 4 is an enlarged view concretely explaining a urea water injection unit according to another embodiment of the present invention.

FIG. 2 is a block diagram showing a system for denitrifying exhaust gas, which can prevent a urea water supply line and an injection nozzle from being clogged, according to an embodiment of the present invention, FIG. 3 is an enlarged view concretely explaining a urea water injection unit according to an embodiment of the present invention, FIG. 4 is an enlarged view concretely explaining a urea water injection unit according to another embodiment of the present invention, and FIG. 5 is an enlarged view concretely explaining a urea water injection unit according to still another embodiment of the present invention.

Referring to FIGS. 2 and 3, the system for denitrifying exhaust gas, which can prevent a urea water supply line and an injection nozzle from being clogged, according to an embodiment of the present invention includes a discharge unit 1, an output sensor 2, a urea water injection unit 3, a reaction chamber 4, a reactor 5, a heat exchanger 6 and a control unit 7.

As the discharge unit 1, LNG gas dischargers for steam supply and power generation, engines for thermal power generation and the like, which discharge gas or fluid required to be denitrified may be used. In addition, various sources for discharging gas or fluid containing nitrogen oxides may also be used as the discharge unit 1.

The output sensor 2 serves to detect the information about the load factors affecting the generation of the exhaust gas of the discharge unit 1 and then transmit the information to the following control unit 7. In this case, since the amount of nitrogen oxides included in the discharged gas or fluid is determined by the load factors of the discharge unit 1, the information about RPM, current density, outlet temperature and the like, by which the load factors of the discharge unit 1 can be determined, is transmitted to the control unit 7, thus allowing the control unit to control the amount of urea water supplied to the reaction chamber 4 such that the amount thereof is suitable to the denitrification of nitrogen oxides included in exhaust gas. Therefore, the amount of nitrogen oxides included in the exhaust gas can be determined by the output sensor, so that a nitrogen oxide analyzer and an ammonia analyzer are not required, thereby constructing competitive equipment.

The urea water injection unit 3 is configured to supply urea water and air into the following reaction chamber 4. The urea water injection unit 3 includes an air supply unit 31, a urea water supply unit 32, a water supply unit 33, and an injector 34.

The air supply unit 31 is configured such that external air is introduced into the injector 34 through an air supply line 311 and is then discharged to the reaction chamber 4 from the injector 34. The air supply unit 31 includes an air moving unit 312, an air filter 313 and an air control valve 314.

The air moving unit 312 is configured to move air such that external air is introduced into the injector 34 through the air supply line 311 and is then discharged to the reaction chamber 4 from the injector 34, and the operation of the air moving unit 312 is controlled by the following control unit 7. For example, the air moving unit 312 may be an air blower or an air compressor.

The air filter 313, one side of which is connected to the outlet of the air moving unit 312, functions to remove foreign matter from air.

The air control valve 314, one end of which is connected to the outlet of the air filter 313, is configured to control the amount of the air supplied to the injector 34. A two-way ball valve or the like may be used as the air control valve 314.

The urea water supply unit 32 is configured such that urea water is introduced into the injector 34 through a urea water supply line 321 and is then discharged to the reaction chamber 4 from the injector 34. The urea water supply unit 32 includes a urea water storage tank 322, a flow meter 323, a flow control valve 324 and a flow control pump 325.

The urea water storage tank 322, which is configured to store urea water, may not be a high-pressure gas container, such as an ammonia storage tank, and one side thereof is connected to the flow meter 323. Generally, the urea water storage tank 322 may be formed in a variety of shapes, such as a cylinder, a rectangle and the like, and may be formed of various materials such as SUS304, SPV300 and the like in various sizes and capacities.

The flow meter 323, one side of which is connected to the outlet of the urea water storage tank 322 and the other side of which is connected to the flow control valve 324, is configured to measure the amount of urea water discharged from the urea water storage tank 322. As the flow meter 323, a commercially-available flow meter may be used. For example, a turbine-type flow meter having a flow rate of 5.7~85 liter/min (FM4-8N3CFA3G, manufactured by Daerim Flowmeter Co., Ltd.) may be used as the flow meter 323.

The flow control valve 324 is configured to selectively supply water and urea water and control the amount thereof. A three-way valve is used as the flow control valve 324. Both input ends (A and B) of the flow control valve 324 are connected to the output end of the flow meter 323 and a water supply line 331, respectively, and the output end (C) of the flow control valve 324 is connected to a flow control pump 325. The principle of selectively supplying water and urea water to the injector 34 using the flow control valve 324 will be described in detail as follows.

The flow control pump 325, one side of which is connected to the output end of the flow control valve 324, is configured to supply water or urea water to the injector 34 depending on the opening of the flow control valve 324. The flow control pump 325 can control the amount of water or urea water supplied to the injector 34 by controlling its output. For example, a flow control pump, the body of which is made of SCS13 and the trim of which is made of SUS316, having a flow rate of 5.7~85 liter/min (YAD-12211(½"), manufactured by Daerim Flowmeter Co., Ltd.) may be used as the flow control pump 325.

The water supply unit 33 is configured to supply water to the injector 34, and includes a water supply line 331 and a water storage tank 332.

The water supply line 331 is a passage for supplying the water stored in the water storage tank 332 to the injector 34, and is connected to the input end (B) of the flow control valve 324 to be connected to the urea water supply line 325 by the flow control valve 324.

The water storage tank 332, which is configured to store water, is connected to the input end (B) of the flow control valve 324 by the water supply line 331. Generally, the water storage tank 332 may be formed in a variety of shapes, such as a cylinder, a rectangle and the like, and may be formed of various materials such as plastic and the like in various sizes and capacities.

The injector 34 is connected to the output end of the air control valve 314 of the air supply unit 31 and the output end of the flow control pump 325 of the urea water supply unit 32, and functions to inject air and water or urea water into the reaction chamber 4 using an injection nozzle 341. For example, a circular wide-angle injector, which is made of SUS304, having an injection rate of 33 liter/hr (Setup No. 26, manufactured by Spraying Systems Co. Korea) may be used as the injector 34.

Hereinafter, the principle of supplying urea water to the reaction chamber 4 using the above-configured urea water injection unit 3, and the principle of washing the urea water supply line and the injection nozzle 341 of the injector 34 will be described in detail.

First, the principle of supplying urea water to the reaction chamber 4 using the urea water injection unit 3 will be explained. Here, when the output sensor 2 detects the information about the load factors affecting the generation of the exhaust gas of the discharge unit 1 and then transmits the information to the control unit 7, the control unit 7 opens the flow control valve 324 of the urea water supply unit 32 in a direction of A-C and operates the flow control pump 325. According to the operation of the flow control pump 325, the urea water stored in the urea water storage tank 322 sequentially passes through the flow meter 323, the flow control valve 324 and the flow control pump 325 to be introduced into the injector 34. Further, since the control unit 7 operates the flow control pump 325 and simultaneously operates the air moving unit 312 of the air supply unit 31, external air sequentially passes through the air filter 313 and the air control valve 314 to be introduced into the injector 34. The urea water introduced into the injector 34 is sprayed by the air introduced into the injector 34 to be discharged to the reaction chamber 4 by the injection nozzle 341. In the procedure of continuously discharging urea water to the reaction chamber 4 by the injector nozzle 341 of the injector 34, the air introduced into the injector 34 by the air supply unit 31 is heated by the high-temperature exhaust gas in the reaction chamber 4 to evaporate the urea water introduced into the injector. When the urea water is evaporated, the urea water is coagulated to clog the injection nozzle 341, so that the injection nozzle 341 can no longer inject the urea water into the reactor chamber any more. Further, in the procedure of introducing urea water into the injector 34 by the flow control pump 325, since the urea water has a predetermined viscosity, the urea water does not pass through the urea water supply line 321 from the output end of the flow control pump 325 to the injector 34 and stays therein to form a dead zone. The urea water staying in the dead zone coagulates, and further coagulates during the procedure of continuously supplying the urea water into the injector 34, so that the urea water supply line 321 is clogged by the coagulated urea, with the result that the injection nozzle 341 can no longer inject the urea water into the reactor chamber.

Further, the principle of washing the injection nozzle 341 and urea water supply line 321 which are clogged in the procedure of continuously discharging urea water to the reaction chamber 4 will be explained. Here, when the injection nozzle 341 can no longer discharge urea water to the reaction chamber 4, the control unit 7 opens the flow control valve 324 in a direction of B-C while the flow control pump 325 and the air moving unit 312 operate, so that the urea water is no longer supplied to the injector 34, and the water stored in the water storage tank 332 passes through the flow control valve 324 and the flow control pump 325. The water discharged to the output end of the flow control pump 325 reaches the injector 34 while dissolving the coagulated urea, and is sprayed by the air introduced by the air supply unit 31 to dissolve the urea coagulated in the injection nozzle 341, and the dissolved urea is discharged into the reaction chamber by the injection nozzle 341. Since Urea easily dissolves in water because it is a material having strong polarity, the problem of the urea water supply line 321 and the injection nozzle 341 being clogged can be solved by supplying the water. After the problem is solved, the control unit 7 opens the flow control valve 314 in a direction of A-C to supply urea water to the reaction chamber 4 again.

The reaction chamber 4 is configured such that exhaust gas discharged by the discharge unit 1 is mixed with urea water injected by the injector 34 to convert the urea water into ammonia, thus forming a gas mixture of ammonia and exhaust gas. That is, the urea water injected by the injector 34 is mixed with high-temperature exhaust gas to be heated to an adequate temperature of 250~400° C., and the heated urea water is converted into ammonia by a chemical reaction represented by the following Formula (1), so that a gas mixture of ammonia and exhaust gas is supplied to the reactor 5.

$$x\mathrm{H_2O} + 2\mathrm{CO(NH_2)_2O_2} \rightarrow 2\mathrm{NH_3} + \mathrm{CO_2} + (x-1)\mathrm{H_2O} \quad (1)$$

The reactor 5 includes a catalyst therein, and is configured to denitrify the gas mixture of ammonia and exhaust to convert nitrogen oxide ($NO_x$) into harmless compounds. A selective catalytic reduction (SCR) reactor, manufactured by SK Corporation, may be used as the reactor. That is, among the gas mixture of ammonia and exhaust gas introduced into the reactor 5, nitrogen oxide ($NO_x$) is converted into harmless compounds by catalytic action at an adequate temperature of 250~400° C. through chemical reactions represented by the following Formulae (2) and (3), and the harmless compounds pass through a heat exchanger 6 and are then discharged to the outside by a stack 8.

$$4\mathrm{NO} + 4\mathrm{NH_3} + \mathrm{O_2} \rightarrow 4\mathrm{N_2} + 6\mathrm{H_2O} \quad (2)$$

$$2\mathrm{NO_2} + 4\mathrm{NH_3} + \mathrm{O_2} \rightarrow 3\mathrm{N_2} + 6\mathrm{H_2O} \quad (3)$$

In this case, various catalysts may be used. That is, catalysts each including an oxide of V, Mo, W, Cu, Ni, Fe, Cr, Mn, Sn, a sulfate, a rare-earth oxide, a precious metal or the like as a catalytic active site and $Al_2O_3$, $TiO_2$, active carbon, zeolite, silica or the like as a carrier may be used. Among these catalysts, currently, practically used catalysts are $V_2O_5$ (vanadium pentoxide)-based, $MoO_3$ (molybdenum trioxide)-based and $WO_3$ (tungsten trioxide)-based catalysts, each containing $Al_2O_3$ as a carrier. The catalyst containing $Al_2O_3$ as a carrier can be applied only to exhaust gas that does not contain any $SO_x$ because it is sulfated in $SO_x$-containing exhaust gas, such as exhaust gas of coal or exhaust gas of heavy oil, so that its specific area decreases, and thus it deteriorates.

The heat exchanger 6, which is equipment recovering and using the heat discharged after primarily producing power using a self power generation facility without depending on the thermal energy produced by the operation of a boiler and the electric energy received from an external power supply company, is provided with a passage for supplying cooling water into the heat exchanger 6 and a passage for discharging the heat-exchanged cooling water from the heat exchanger 6.

The control unit 7 is configured to control the entire system for denitrifying exhaust gas according to the present invention. As described above, the control unit 7 functions to determine whether or not urea water is supplied depending on the amount of nitrogen oxide ($NO_x$) included in exhaust gas according to the load factors detected by the output sensor 2 to control the amount of urea water supplied by the urea water supply unit 32. Further, when the injection nozzle 341 or the urea water supply line is clogged, the control unit 7 functions to control the water supply unit 33 to wash the injection nozzle 341 and the urea water supply line 321. That is, the control unit 7 functions to control and adjust the entire system for denitrifying exhaust gas.

A system for denitrifying exhaust gas, which can prevent a urea water supply line and an injection nozzle from being clogged, according to another embodiment of the present invention may further includes a bypass line 35 for connecting the urea water supply line 321 located behind the output end of the flow control pump 325 with the air supply line 311, as shown in FIG. 4. An air control valve 314', which is a three-way valve, is provided at the portion at which the bypass line 35 is connected with the air supply line 311.

The principle of supplying urea water to the reaction chamber 4 by the injector 34, shown in FIG. 4, is the same as the principle thereof shown in FIG. 3, except that the control unit 7 controls the air control valve 314' such that the air control valve 314' is opened in a direction of D-F. Further, the principle of washing the injection nozzle 341 and urea water supply line 321 which are clogged in the procedure of continuously discharging urea water to the reaction chamber 4, shown in FIG. 4, is the same as the principle thereof shown in FIG. 3. That is, the coagulated urea clogging the urea water supply line 321 and the injection nozzle 341 is removed by water, and then the operation of the flow control pump 325 is stopped to stop the supply of water. Thereafter, the air control valve 314' is opened in a direction of D-E to supply air into the urea water supply line 321. The air introduced into the urea water supply line 321 pushes the water remaining in the urea water supply line 321 towards the injector 34 to prevent water from remaining in the urea water supply line 321, so that it is possible to prevent the concentration of urea water from becoming low when urea water is supplied again, thereby preventing the urea water supply line from being corroded by water.

The system for denitrifying exhaust gas, which can prevent a urea water supply line and an injection nozzle from being clogged, according to still another embodiment of the present invention will now be explained with reference to FIG. 5. Here, the system for denitrifying exhaust gas shown in FIG. 5 is the same as that shown in FIGS. 2 to 4, except for the disposition of an air supply unit, a urea water supply unit and a water supply unit.

The air supply unit 31 includes an air moving unit 312 for moving air to introduce external air into an injector 34 through an air supply line 311, an air filter 313 connected to the outlet of the air moving unit 312, and a three-way type air control valve 314' connected to the outlet of the air filter 313. The urea water supply unit 32 includes a urea water supply line 321 through which urea water passes, a urea water storage tank 322 for storing urea water, a flow meter 323 connected to the outlet of the urea water storage tank 322, a flow control pump 325 connected to the output end of the flow meter 323, and a three-way type flow control valve 324 connected to the output end of the flow control pump 325. The water supply unit 33 includes a water storage tank 332 for storing water, a water control pump 333 connected to the outlet of the water storage tank 332, and a water control valve 334 connected to the output end of the water control pump 333. The end of a water supply line 331 is connected to one input end (B) of the flow control valve 324 of the urea water supply unit, and thus the water supply line 331 is connected to the urea water supply line 321. An air bypass line 36 through which air is transferred to the water supply line 331 may be provided between the air supply line 311 and the water supply line 331. One end of the air bypass line 36 is connected to one output end (E) of the air control valve 314' of the air supply unit 31, and the other end thereof is connected to one input end (H) of the water control valve 334 of the water supply unit 33.

The principle of supplying urea water to the reaction chamber 4 using the above-configured urea water injection unit 3 will now be explained. Here, when the output sensor 2 detects the information about the load factors affecting the generation of the exhaust gas of the discharge unit 1 and then transmits the information to the control unit 7, the control unit 7 opens the flow control valve 324 of the urea water supply unit 32 in a direction of A-C and operates the flow control pump 325. According to the operation of the flow control pump 325, the urea water stored in the urea water storage tank 322 sequentially passes through the flow meter 323, the flow control pump 325 and the flow control valve 324 to be introduced into the injector 34. Further, since the control unit 7 operates the flow control pump 325, and simultaneously opens the air control valve 314' of the air supply unit 31 in a direction of D-F, and operates the air moving unit 312 of the air supply unit 31, external air sequentially passes through the air filter 313 and the air control valve 314' to be introduced into the injector 34. The urea water introduced into the injector 34 is sprayed by the air introduced into the injector 34 to be discharged to the reaction chamber 4 by the injection nozzle 341. As described in the present invention shown in FIGS. 2 and 3, in the procedure of continuously discharging urea water to the reaction chamber 4 by the injection nozzle 341 of the injector 34, the injection nozzle 341 and the urea water supply line 321 located behind the output end of the flow control pump 325 are clogged.

Further, the principle of washing the injection nozzle 341 and urea water supply line 321 which are clogged in the procedure of continuously discharging urea water to the reaction chamber 4 will now be explained. Here, in the case where the injection nozzle 341 can no longer discharge urea water to the reaction chamber 4 or washing is required, when the operation of the flow control pump 325 is stopped and the water control pump 333 is operated while opening the water control valve 334 in a direction of G-I and opening the flow control valve 324 in a direction of B-C, the water stored in the water storage tank 332 passes through the water control pump 333, the water control valve 334 and the flow control valve 324. The water discharged to the output end of the flow control valve 324 reaches the injector 34 while dissolving the coagulated urea, and is sprayed by the air introduced by the air supply unit 31 to dissolve the urea coagulated in the injection nozzle 341, and the dissolved urea is discharged into the reaction chamber by the injection nozzle 341. After solving the problem of the urea water supply line 321 and the injection nozzle 341 being clogged, the operation of the water control pump 33 is stopped, the air control valve 314' is opened in a direction of D-E, and the water control valve 334 is opened in a direction of H-I to allow air to push the water remaining in the water supply line 331 and the urea water supply line 321 toward the injector 34 through the air bypass line 36, thereby preventing water from remaining in the water supply line 331 and the urea water supply line 321. Therefore, it is possible to prevent the concentration of urea water from becoming low when urea water is supplied again, thereby preventing the water supply line 331 and the urea water supply line 321 located behind the output end of the water control valve 324 from being corroded by water.

According to an embodiment of the present invention, a device for supplying urea water, which can prevent urea water from coagulating, includes an air supply unit, a urea water supply unit, a water supply unit and an injector. Here, since the air supply unit, urea water supply unit, water supply unit and injector are the same as those shown in FIGS. 3 to 5, detailed descriptions thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Simple modifications, additions and substitutions of the present invention belong to the scope of the present invention, and the specific scope of the present invention will be clearly defined by the appended claims.

The invention claimed is:

1. A system for denitrifying exhaust gas comprising:
   a urea water injection unit for supplying urea water and air to a reaction chamber, wherein the urea water injection unit comprises:
      an air supply unit for supplying external air to an injector through an air line;
      a urea water supply unit for supplying urea water to the injector through a urea water supply line;
      a water supply unit for supplying water to the injector through a water supply line connected to one side of the urea water supply line;
      a flow control valve for selectively supplying the air, the water or the urea water to the injector through the urea water supply line;
      the injector respectively connected to the air supply unit and the urea water supply unit to selectively discharge the air, the urea water or the water to the reaction chamber through an injection nozzle;
      an air bypass line for connecting the air supply line with the water supply line;
      an air control valve provided at a portion at which the air supply line is connected with the air bypass line to control the air such that the air is supplied to the injector through the air supply line or is supplied to the air bypass line; and
      a water control valve provided at a portion at which the water supply line is connected with the air bypass line to control the air and the water such that the air supplied through the air bypass line and the water is supplied to the water supply line and the urea water supply line;
   wherein the water is supplied to the injection nozzle and urea water supply line which are clogged in a procedure of continuously discharging urea water into the reaction chamber, thus preventing the injection nozzle and the urea water supply line from being clogged, and the air is supplied through the air bypass line and the water supply line and the urea water supply line and is allowed to push the water remaining in the water supply line and the urea water supply line toward the injector, thus preventing the water supply line and the urea water supply line from being corroded by water and preventing the concentration of urea water from being low when urea water is supplied again.

2. The system for denitrifying exhaust gas of claim 1, wherein the air supply unit comprises an air moving unit provided at the starting point of the air supply line to move air;
   the urea water supply unit comprises a urea water storage tank provided at the starting point of the urea water supply line to store urea water; and
   the water supply unit comprises a water storage tank provided at the starting point of the water supply line to store water.

3. The system for denitrifying exhaust gas of claim 2, wherein the urea water supply unit further comprises a flow control pump, one side of which is connected to an outlet of the urea water storage tank and the other side of which is connected to the flow control valve; and
   the water supply unit further comprises a water control pump, one side of which is connected to an outlet of the water storage tank and the other side of which is connected to the water control valve.

4. A device for supplying urea water which can prevent urea water from coagulating, comprising:
   an air supply unit for supplying external air to an injector through an air supply line;
   a urea water supply unit for supplying urea water to the injector through a urea water supply line;
   a water supply unit for supplying water to the injector through a water supply line connected to one side of the urea water supply line;
   a flow control valve for selectively supplying water or urea water to the injector through the urea water supply line; and
   the injector respectively connected to the air supply unit and the urea water supply unit to selectively discharge air, urea water or water to the reaction chamber through an injection nozzle;
   an air bypass line for connecting the air supply line with the water supply line;
   an air control valve provided at a portion at which the air supply line is connected with the air bypass line to control air such that the air is supplied to the injector through the air supply line or is supplied to the air bypass line; and
   a water control valve provided at a portion at which the water supply line is connected with the air bypass line to control air and water such that the air supplied through the air bypass line and the water is supplied to the water supply line and the urea water supply line;
   wherein the water is supplied to the injection nozzle and urea water supply line which are clogged in a procedure of continuously discharging urea water into the reaction chamber, thus preventing the injection nozzle and the urea water supply line from being clogged, and the air is supplied through the air bypass line and the water supply line and the urea water supply line and is allowed to push the water remaining in the water supply line and the urea water supply line toward the injector, thus preventing the water supply line and the urea water supply line from being corroded by water and preventing the concentration of urea water from being low when urea water is supplied again.

* * * * *